Patented July 11, 1939

2,165,484

UNITED STATES PATENT OFFICE 2,165,484

CONDENSATION PRODUCT HAVING AN AMIDELIKE STRUCTURE

Johann Huismann, Leverkusen-Wiesdorf, Germany, assignor to I. G. Farbenindustrie Aktiengesellschaft, Frankfort-on-the-Main, Germany No Drawing. Application October 2, 1936, Serial No. 103,712. In Germany October 5, 1935

1 Claim. (Cl. 260—553)

The present invention relates to new condensation products of aromatic sulfonic acids having an amide-like structure and to a process for preparing the said products.

In accordance with the present invention valuable condensation products of aromatic sulfonic acids are obtainable by reacting an aromatic disulfo- or dicarboxylic acid halide, an aliphatic dicarboxylic acid halide or phosgene with 2 molecule proportions of an aminoarylacidylarylamide (acidyl=$SO_2$ and /or $CO$), the said amide containing at least one sulfonic acid group and at least one amino group capable of being acylated, then reducing the nitro groups contained in the reaction product and/or setting free such amino groups as are not acylated by an aromatic residue and acylating in the products thus obtained any free amino group by means of an aryl sulfonic acid or arylcarboxylic acid residue. In the process described before the reaction components are to be chosen in such a way that the final products contain at least 4 sulfonimido groups and at least 2 sulfonic acid groups. The final products represent polyarylsulfonarylamide derivatives containing at least 5 aromatic nuclei and being long-chained constituted.

In the present process one may use, for instance, the halides of the disulfonic- or dicarboxylic acids of the benzene-, diphenyl- and naphthalene series, such as the benzenedisulfonic acids, toluenedisulfonic acids, naphthalene-1.5- or -2.6-disulfonic acid, diphenylsulfondisulfonic acid, phthalic acid, isophthalic acid, oxalic acid and the like. The sulfo- or carboxylicarylamides to be used in the present process may be used alone or in admixture with one another. They may contain besides other substituents nitro groups or amino groups being acylated by a nonaromatic residue. In such cases the nitro groups are preferably reduced or the acylamino groups are saponified and the free amino groups thus formed are further acylated, for instance, by means of an aromatic sulfonic or carboxylic acid halide, the said halide being preferably substituted in the meta- or in the meta- and para-position to the acid halide group preferably by halogen.

The condensation of the acid halides with the amino compounds may be carried out in accordance with known methods, preferably in an aqueous medium and in the presence of an acid binding agent.

Compounds of the kind specified may also be obtained by reacting an aromatic disulfonic acid halide with an excess of an aromatic diamino compound containing at least one sulfonic acid group and acylating the free amino groups by means of an arylsulfonic or carboxylic acid residue. The reaction proceeds in this case in such a manner that at first 2 mols of the diamino compound are combined with 1 mol of the disulfonic acid halide with the formation of an amide of the following formula:

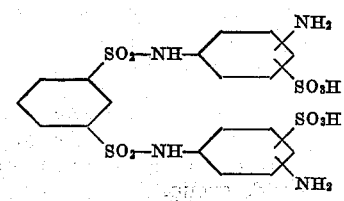

According to the quantity of the diamino compound used it is possible to obtain still higher nuclear compounds by reacting on the free amino groups of the condensation products with further quantities of the reactive acid compounds thus obtaining, for instance, a compound of the formula:

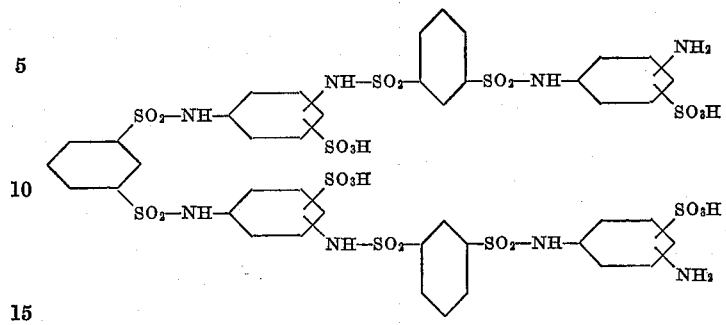

These products may contain different proportions of compounds with longer or shorter chains according to the quantities of the starting materials used respectively. It is hardly possible to give exact data regarding the constitution of the said products in this respect, this knowledge being, however, not necessary for carrying on the next steps of the process. The next step comprises the conversion of the mixture of polynuclear amino sulfonic acids into products which do not further possess free amino groups by reacting upon the said mixture with a sufficient quantity of a suitable arylsulfonic acid- or carboxylic acid halide. If nitro groups should be present in the products these groups are reduced at first and then acylated by reacting upon them with the acid halides mentioned before.

Of disulfonic acids the halides of which come into consideration as initial material for the pressent process, the disulfonic acids of the benzene-, diphenyl- or naphthalene series may be mentioned by way of example, for instance, benzene disulfonic acids, substituted benzene disulfonic acids, naphthalene-1,5- or 2,6-disulfonic acid, diphenyl- disulfonic acid and the like. On the other hand, the diamino compounds which come in consideration for the present process may belong, for instance, to the benzene- or diphenyl series. Particularly suitable for this purpose are the symmetrically composed diamino compounds, for instance, the 2,6-tolylene-diamine-4-sulfonic acid and the benzidine-2,2'-disulfonic acid. But also unsymmetrically constituted diamino compounds may be used, for instance, the 1,3-phenylenediamino-4-sulfonic acid, the 2,4-tolylenediamine-5-sulfonic acid, 1,4-phenylenediamine-2-sulfonic acid, further, benzidine and toluidine-mono sulfonic acids or diarylenediamine sulfonic acids having combined the two aryl nuclei with a bridge (for instance, 4,4'-diaminostilben-disulfonic acid, 4,4'-diaminodibenzyl-disulfonic acid) or aminoarylsulfonarylamide sulfonic acids (for instance the bis-(3'-aminobenzene-1'-sulfonyl)-2,6-tolylenediamine-4-sulfonic acid). For the acylation of the free amino groups at the end of the process any aromatic sulfonic acid- or carboxylic acid halides, for instance, of the benzene- or naphthalene series, are suitable. In some cases it has proved suitable to use such products which are substituted by two or more halogen atoms, preferably in meta- or in meta- and para-position to the acid halide group.

The condensation of the acid halides with the amino compounds proceeds in accordance with the known methods, preferably in aqueous media in the presence of acid binding agents.

The alkali metal and ammonium salts of the condensation products thus obtained dissolve in water to more or less viscous solutions which after weak acidification yield excellent tanning extracts. They yield on tanning in the usual manner a beautiful white leather which is fast to light. Furthermore, the products may be used as reserving agents for animal fibers against coloration by substantive dyestuffs, and as precipitating agents for basic dyestuffs for dyeing lacquers. The new products are distinguished over the known condensation products of aromatic diamines with aromatic sulfonic acid- or carboxylic acid halides in that they show in general a reduced sensitiveness to salt and a better fastness to light.

The invention is further illustrated by the following examples without being restricted thereto, the parts being by weight:

*Example 1.*—483 parts of 3''-aminobenzene-1''-sulfonyl-3'-aminobenzene-1'-sulfonyl-aniline-4-sulfonic acid (obtainable by condensation of aniline -4-sulfonic acid sodium in an aqueous solution with 3-nitrobenzene-4-sulfochloride in the presence of chalk, reduction of the condensation product with iron powder, further condensation with the necessary quantity of 3-nitrobenzene-sulfochloride of the amino compound obtained and repeated iron reduction) are dissolved in about 3400 parts of water and the equivalent quantity of caustic soda solution. The well-stirred solution is treated at a temperature of about 40° C. with 80 parts of chalk and 215 parts of a 1,2-dichlorobenzene-4,6-disulfochloride melting at temperature of 110–111° C. and which may be obtained in a pure state by several hours' boiling of 1,2-dichlorobenzene with about the ten-fold quantity of chlorosulfonic acid, pouring the cooled sulfonation mixture upon ice and redissolving the precipitated and dried disulfochloride from benzene. Preferably the disulfochloride is sieved before decomposition and then ground with cold water to a fine paste. The mixture is stirred for about 12 hours at a temperature of 40° C. and then the temperature is gradually increased during some hours to 60–70° C. and at last to 90–95° C., whereby care must be taken that the reaction remains neutral by adding further quantities of chalk if desired. If a test portion taken from the condensation mixture does no longer take up any nitrite the liquid is rendered clearly mineral acid with crude hydrochloric acid and the reaction product is salted out while warm by means of a concentrated calcium chloride solution. The product hereby separates in an oily form and solidifies on cooling of the mixture to a viscous light-colored syrup the aqueous liquid of which must be removed as far as possible by pouring or pressing off.

For purification and transformation of the sodium calcium salt mixture into a uniform calcium salt the condensation product is dissolved 2–3 times with 2000 parts of water each at a temperature of about 60° C., the concentrated calcium chloride solution is reprecipitated and in the cold removed from the lyes by pouring and pressing off. The viscous syrup obtained is at last dissolved while hot with about 1000 parts of water and the calcium salt of the condensation product is transformed into the corresponding ammonium salt by introduction of the necessary quantity of ammonium oxalate into the well-stirred solution at a temperature of 60–70° C. The light-yellow syrup separated from the calcium oxalate, which syrup is sucked off while hot contains besides small quantities of ammonium chloride substantially the condensation product of the formula:

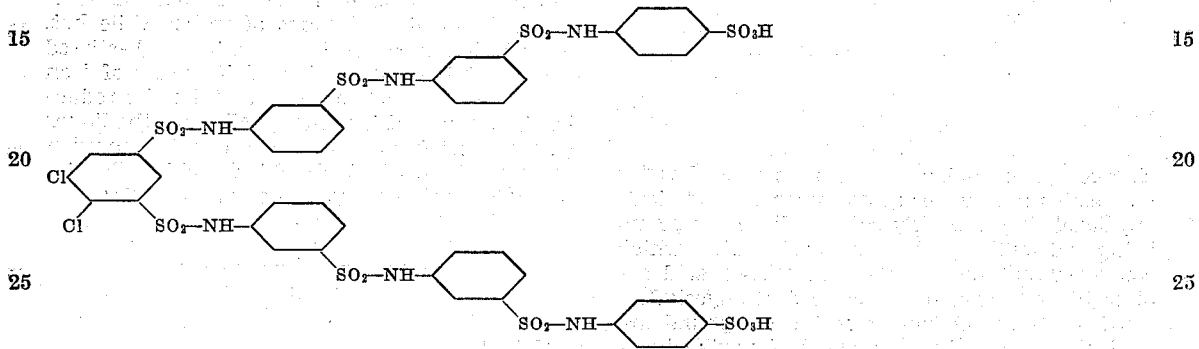

The dry substance obtained by evaporating of the syrup is a light yellow powder which sinters on pouring over water and which readily dissolves. The weakly acidified solution represents a good tanning extract. Also the product is suitable as preserving agent for animal fibers against coloring with substantive dyestuffs and as precipitating agent for basic dyestuffs.

The 3″-aminobenzene- 1″-sulfonyl-3′-aminobenzene-1′-sulfonyl-aniline-4-sulfonic acid may be substituted by other 2- or polynuclear amidoarylsulfonarylamide sulfonic acids obtained according to the same synthesis, the single chain members of which may belong to the benzene, naphthalene or diphenylene series and which, for instance, may be substituted by halogen or alkyl groups. Instead of the 1,2-dichlorobenzene-4,6-disulfochloride employed in this case for linking the chains also the benzene-1,3-disulfochloride, the toluenedisulfochloride, other halogen-substituted benzenedisulfochlorides, naphthalene or diphenylene disulfochlorides or aromatic and aliphatic dicarboxylic acid chlorides including phosgene may be employed. It is also possible to use variously constituted mixtures of amidoarylsulfonarylamide sulfonic acids for the reaction, whereby also the properties of the end products according to the purposes they are used for may be influenced to a marked extent.

Example 2.—206 parts of mono-3,4-dichlorobenzene-1-sulfonyl-2,6-toluylene-4-sulfonic acid (obtainable by condensation of the 6-oxalylamido-2-toluidine-4-sulfonic acid with 3,4-dichlorobenzene-1-sulfochloride and saponification of the oxalyl group) are neutrally dissolved with about 2500 parts of water while adding 27 parts of caustic soda solution. Into the solution treated with 42 parts of chalk 86 parts of benzene-1,3-disulfochloride are introduced at normal temperature, which substance first has been ground with water to a fine paste. The mixture is stirred at normal temperature until only small traces of the diazotized substance are present in the reaction liquid. Then the whole is heated for some hours to temperatures of 50–60° C., acidified with crude hydrochloric acid and then the condensation product is precipitated with concentrated calcium chloride solution. The syrup obtained which is viscous after pouring and pressing off in the cold is still twice or three times dissolved with 900 parts of warm water at 60° C. and precipitated with the necessary quantity of concentrated calcium chloride solution.

The calcium salt thus obtained is transformed by double decomposition with sodium oxalate or ammonium oxalate into the corresponding sodium or ammonium salt. These salts of the condensation product of the formula:

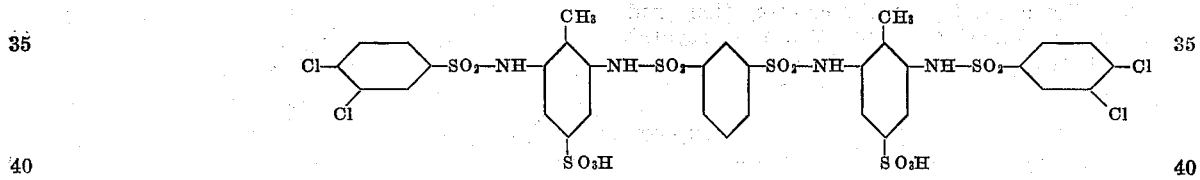

form if they are dried colorless powders which easily dissolve in water. The weakly acidified solutions represent excellent tanning extracts capable of transforming the animal skin pretreated in the usual manner into a white leather being extraordinary fast to light.

Example 3.—351 parts of mono-3-nitrobenzoyl-2,6-toluylene-diamine-4-sulfonic acids (obtainable, for instance, by condensation of 6-oxalylamido-2-toluidine-4-sulfonic acid with 3-nitrobenzoylchloride and following saponification of the oxalylamido group) are dissolved while hot with about 2000 parts of water and the equivalent quantity of caustic soda solution. After cooling to about 25° C. 80 parts of chalk and a paste of 173 parts of benzene-1,3-disulfochloride well-ground with a small quantity of cold water are added. The whole is stirred at normal temperature until only small traces of diazotizable substance are to be found. After slowly heating to 50–60° C. and some hours standing while maintaining the temperature the reaction mixture is rendered acid to Congo with crude hydrochloric acid. Hereby the condensation product precipitates in a syrupy form and, after cooling, pouring and pressing off the mother liquor may be obtained in the form of a viscous, coherent, brownish colored cake. The product obtained is redissolved while hot with about 2000 parts of water and the whole is introduced into a well-stirred elutriation of 400 parts of iron powder in 2000 parts of water, the elutriation being weakly acidified with hydrochloric acid and having a temperature of 90° C. After the reduction is complete it is rendered alkaline with caustic soda lye, the liquid is sucked off from the iron sludge and is poured on a solution of remaining crude hydrochloric acid in cold water, whereby the reduction product of the following formula separates in a good yield as a coarse powder:

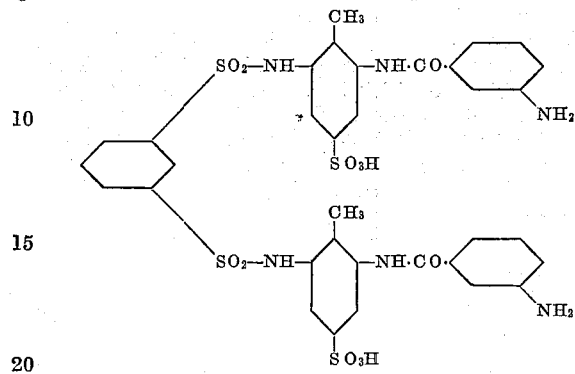

The compound difficultly dissolves in cold water but easily in hot water containing soda and yields on diazotizing a weakly colored diazo compound being difficultly soluble in cold water which couples with 2-naphthol-3,6-disulfonic acid sodium to an orange to red colored azo dyestuff.

211 parts of the pure diamino compound are neutrally dissolved with about 2500 parts of water and the necessary quantity of caustic soda solution. 148 parts of 3,4-dichlorobenzene-1-sulfochloride are caused to flow into the well-stirred solution of 75° C. which is treated with 40 parts of chalk. The reaction soon takes place and, after a short time, the condensation product of the following formula begins to separate as a viscous mass:

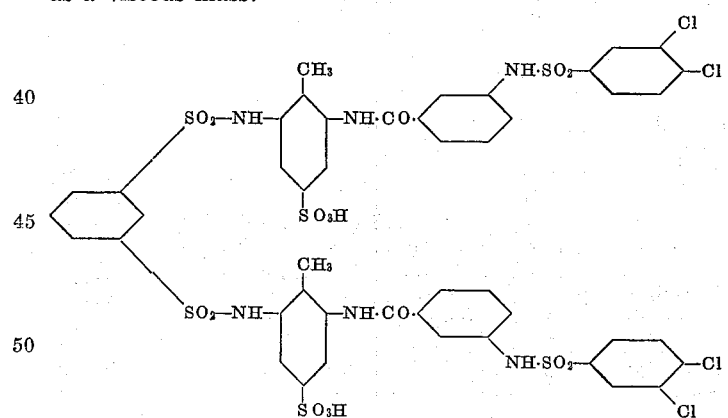

After stirring some time at a temperature of 80–90° C. it is rendered mineral acid with crude hydrochloric acid and cooled. The calcium sodium salt of the condensation product separated from the solution as coherent viscouse mass is transformed in the manner described above by repeated precipitation into the calcium salt which is difficultly soluble and which may be freed from neutral salts by washing with hot water. From the calcium salt the easily watersoluble ammonium salt may be obtained by decomposition with the necessary quantity of ammonium oxalate, which salt exhibits excellent tanning properties.

*Example 4.*—387 parts of the mono-nitrobenzene-1-sulfonyl-2,6-toluylene-diamine - 4 - sulfonic acid (obtainable, for instance, by condensation of the 6-oxalylamino-2-toluidine-4-sulfonic acid with 3-nitrobenzenesulfochloride and subsequent saponification of the oxalylamino group) are dissolved with about 3500 parts of water and the equivalent quantity of caustic soda solution. Into the well-stirred solution cooled to about 20° C. 90 parts of chalk and 186 parts of benzene-1,3-disulfochloride which previously have been ground to a homogeneous paste are introduced. The mixture is stirred for about 12 hours at normal temperature which is slowly raised to 50–60° C. at which temperature it is kept for several hours. The solution formed which only may show traces of diazotizable substance is rendered mineral acid with crude hydrochloric acid and reacted with a concentrated calcium chloride solution necessary for precipitating the condensation product. The syrupy substance precipitating is removed as far as possible while cold by pouring and pressing off. It is brought in solution with about 3000 parts of water while hot. The solution is caused to flow into a well-stirred weakly acidified suspension of 400 parts of iron powder in 3000 parts of water. After the reduction is complete it is rendered alkaline, the liquor is sucked off from iron sludge and the solution is poured into excess hydrochloric acid while stirring. The amino compound of the formula:

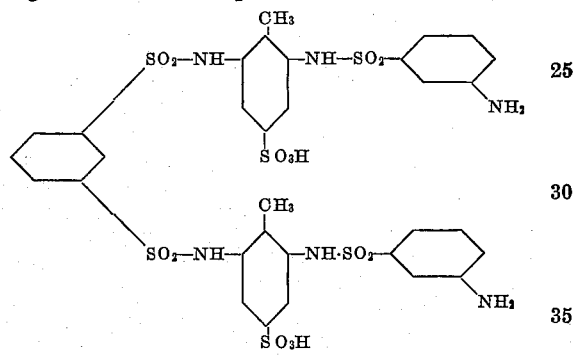

precipitates in a coarse form and may be isolated by filtering with suction. When dry it forms a colorless powder which is difficultly soluble in cold water, more readily soluble in hot water and which on diazotation takes up about the right quantity of nitrite. The tetrazo compound which on diazotation precipitates in the form of weakly colored flakes forms when combined with 2-naphthol-3,6-disulfonic acid sodium in soda alkaline solution an orange red colored azo dyestuff.

229 parts of the diamino compound are brought in solution while neutral with about 3000 parts of water and the equivalent quantity of caustic soda. A solution of 150 parts of crystalline sodium acetate is added and 90 parts of benzoylchloride are added drop by drop at about 40° C. in a stirring apparatus. The free acetic acid is neutralized in the solution with soda and the sodium salt of the condensation product is precipitated with the necessary quantity of a saturated common salt solution. The precipitated syrupy substance solidifies on cooling of the reaction mixture to a viscous paste from which the liquor is poured and pressed off. The product obtained may be purified by redissolving in hot water and precipitating with common salt. The product of the formula:

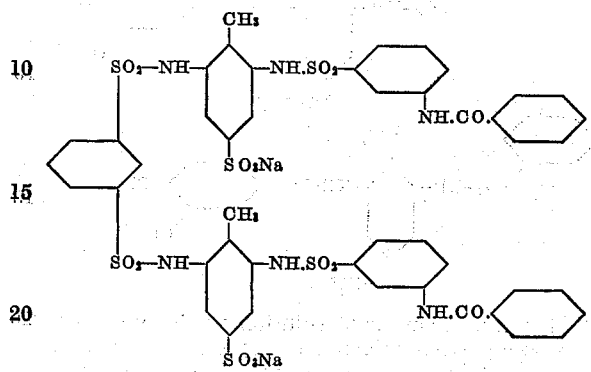

when dried forms a weakly yellowish powder which readily dissolves in cold and warm water and which exhibits good tanning properties.

*Example 5.*—237 parts of the disodium salt of 3-aminobenzene-sulfonyl-2-amino-6-oxalyl-amino-1-toluene-4-sulfonic acid (obtainable by condensation of 6-oxalylamino-2-toluidine-4-sulfonic acid with 3-nitrobenzene-sulfochloride and reduction of the nitro group are dissolved in about 2500 parts of water. 40 parts of chalk and 75 parts of benzene-1,3-disulfochloride are introduced into the well stirred solution at normal temperature, the benzene-1,3-disulfochloride, having first been ground to a homogeneous paste with cold water. The mixture is stirred for several hours until the condensation product precipitates and no substance taking up nitrite is present in the liquor. It is then acidified with crude hydrochloric acid and the granular substance is sucked off. The paste which contains the condensation product of the formula:

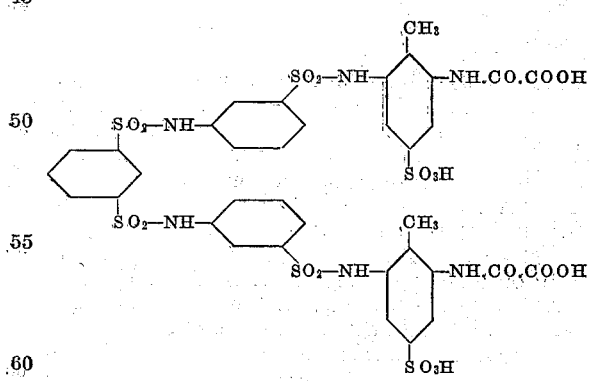

as calcium sodium salt is heated to boiling with 1500 parts by volume of about 10% hydrochloric acid for 1 hour under reflux while stirring. On cooling the sucked through solution the free diamino compound precipitates which may be isolated. It is again dissolved with about 2000 parts of water and the necessary quantity of soda while neutral. After cooling the solution is treated with about 40 parts of chalk and 135 parts of 3,4-dichlorobenzene-1-sulfochloride and stirred at normal temperature until no diazotizable substance is detectable. It is then heated to 50–60° C., acidified with crude hydrochloric acid and the reaction product filtered with suction while cold. The mixed calcium sodium salt obtained in this manner is transformed into the sodium salt in the usual way. The calcium oxalate thus obtained is sucked off while hot and the condensation product of the formula:

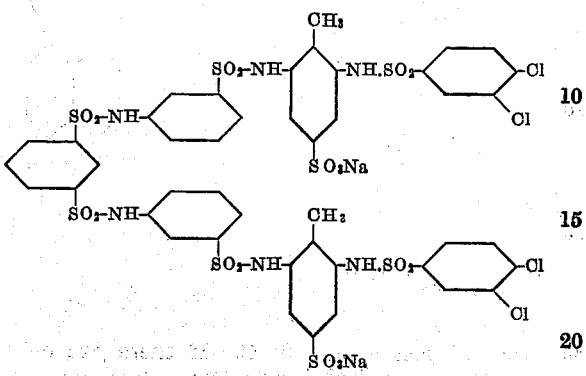

is obtained dissolved to a weakly yellow colored syrup, which yields an excellent tanning extract after the addition of small amounts of organic acids.

*Example 6.*—566 parts of (3'-aminobenzenesulfonyl)-6-amino-(3'',4''-dichlorobenzenesulfonyl)-2-amino-1-toluene-4-sulfonic acid of the formula:

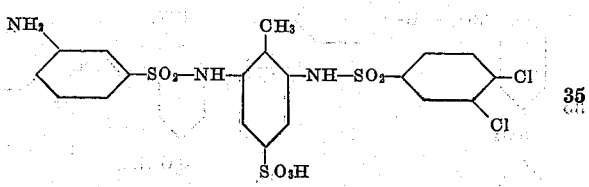

(obtainable, for instance, by decomposition of 3,4-dichlorobenzene-1-sulfochloride with 6-oxalylamino-2-toluene-4-sulfonic acid, saponification of the oxalylamino group, condensation of the saponification product with 3-nitrobenzene-sulfochloride and reduction of the nitro group) are brought into solution with about 4000 parts of water while neutral with the addition of the necessary quantity of caustic soda solution. Into the solution which is cooled to about 20° C. about 70 parts of chalk and 159 parts of benzene 1,3-disulfochloride in the form of an aqueous paste are introduced. The mixture is stirred for about 12 hours at ordinary temperature, slowly heated to 50–60° C., the temperature being maintained for some hours. As soon as only traces of diazotizable substance are detectable the liquor is acidified with crude hydrochloric acid whereby the condensation product precipitates as an oily mass which solidifies on cooling. The substance has the same chemical structure as the crude product mentioned in Example 5 and is worked up in a similar manner to the sodium or ammonium salt respectively.

*Example 7.*—566 parts of (3'-aminobenzenesulfonyl)-6-amino-(3'',4''-dichlorobenzenesulfonyl)-2-amino-1-toluene-4-sulfonic acid are brought in solution with about 4000 parts of water while adding the equivalent quantity of caustic soda solution. The solution is cooled to a temperature of about 20° C., whereupon 80 parts of chalk and 264 parts of sulfobenzidide disulfochloride (Beilstein 4, vol. 11, p. 241) are introduced which previously have been ground with a small quantity of cold water to a homogeneous fine-grained paste. The mixture is well stirred for about 12 hours at ordinary temperature, whereupon the temperature is gradually increased to 60-70° C. during further 12 hours to reach at last about 90° C. If there are only traces of diazotizable substance detectable the liquid is rendered acid to Congo with crude hydrochloric acid whereby the condensation product precipitates as viscous syrup. The cooled liquid is poured off from the solidified paste and pressed off and the mixture of sodium and calcium salt of the condensation product is transformed as described above into the ammonium salt of the formula:

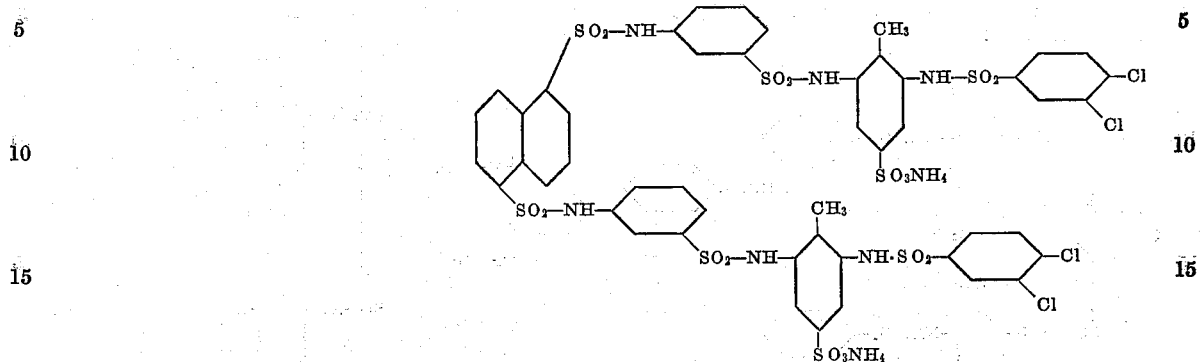

The product yields in an about 25% solution a very thickly liquid yellow syrup from which a nearly colorless powder may be obtained on evaporating, which powder easily dissolves in warm water while sintering. The syrup weakly acidified with organic acid represents an excellent tanning extract.

Example 8.—566 parts of (3'-aminobenzenesulfonyl) - 6 - amino-(3'',4''-dichlorobenzenesulfonyl)-2-amino-1-toluene-4-sulfonic acid are brought in solution while neutral with about 4000 parts of water while adding the necessary quantity of caustic soda solution. The solution is cooled to about 20° C. whereupon 80 parts of chalk and a fine-ground paste consisting of 204 parts of naphthalene-1,5-disulfochloride in a small quantity of cold water are introduced. After about 12 hours' stirring at normal temperature the mixture is heated to about 60° C. during further 12 hours and at last brought to a temperature of 90-95° C. for several hours. If there are only traces of diazotizable substance detectable the condensation product is precipitated while hot with crude hydrochloric acid as light-colored syrup. After cooling the mixture, the liquid is removed by pouring and pressing off, the mass becoming brittle in the cold. From this liquid the easily soluble ammonium salt of the condensation product may be obtained in the manner described. The ammonium salt of the formula:

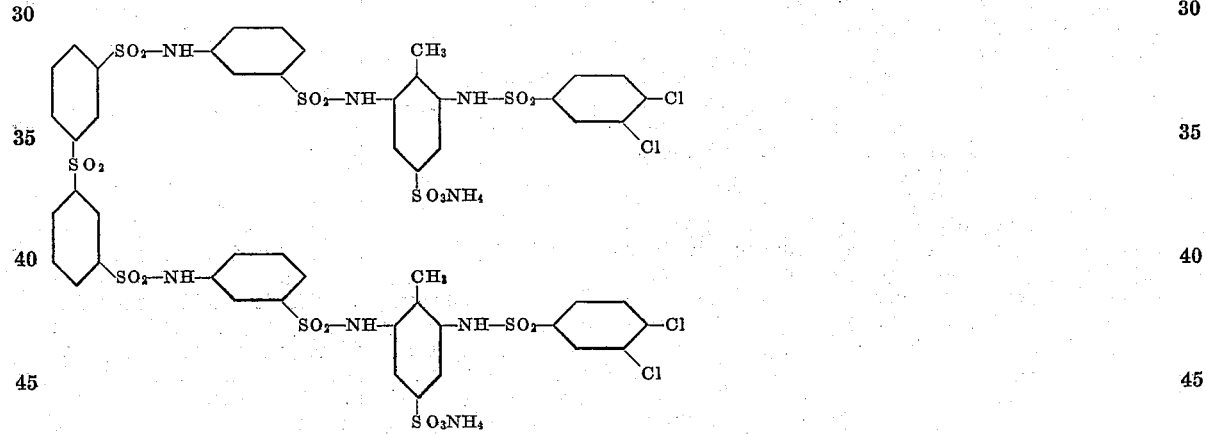

forms in an about 25% solution a thickly yellowish syrup from which on evaporation a nearly colorless powder may be obtained which may easily be dissolved in hot and cold water. The syrup being weakly acidified with organic acids represents an excellent tanning extract. A similar product can be obtained by substituting, for instance, the naphthalene-1,5-disulfochloride by the homologous naphthalene-2,6-disulfochloride.

Example 9.—566 parts of (3'-aminobenzenesulfonyl)-6-amino-(3'',4''-dichlorobenzenesulfonyl)-2-amino-1-toluene-4-sulfonic acid are brought in solution while neutral with about 4000 parts of water while adding the necessary quantity of caustic soda solution. Into the solution phosgene in excess is introduced into the stirring apparatus at about 40° C., whereby by the gradual addition of dilute soda solution care is to be taken that the reaction solution always remains weakly alkaline. If there are no or only very small quantities of diazotizable substance detectable the addition of caustic soda solution is stopped and the reaction mixture is rendered mineral acid by further introducing phosgene. The phosgenation product which first separates in the form of a syrup from the acid solution becomes brittle on cooling of the reaction mass. The clear liquid is removed from the paste by pouring and pressing off and is afterwards brought in solution while hot by adding about 3000 parts of water. The condensation product is precipitated in the form of a mixture of its calcium and sodium salt by adding the necessary quantity of concentrated calcium chloride solution, which salt mixture is transformed into the pure calcium salt by repeatedly precipitating with calcium chloride solution. The calcium salt after having been well pressed off is then transformed into the ammonium salt of the formula:

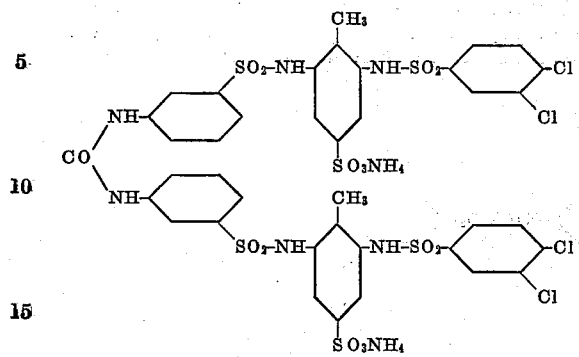

By evaporating the syrup thus obtained a weakly colored powder may be obtained which may be easily dissolved in water and which shows a good tanning action in solutions weakly acidified with organic acids.

During this process the phosgene may, for instance, be substituted by oxalylchloride or another aliphatic dicarboxylic acid chloride without reducing the tanning properties of the products obtained.

*Example 10.*—566 parts of (3'-aminobenzenesulfonyl)-6-amino-(3'',4''-dichlorobenzenesulfonyl)-2-amino-1-toluene-4-sulfonic acid are brought in solution with about 4000 parts of water and the equivalent quantity of caustic soda solution. 80 parts of chalk and 153 parts of isophthalylchloride are introduced into the well-stirred solution at a temperature of 20° C., whereby care is to be taken that the reaction always remains neutral to weakly alkaline by occasionally adding caustic soda solution. After several hours the condensation product begins to separate at the bottom of the vessel in a syrupy state. If there are only small quantities of diazotizable substance detectable it is acidified with hydrochloric acid and the mother lye is poured off from the viscous paste. The mixed calcium sodium salt obtained is transformed in the manner described above into the calcium salt and the calcium salt is transformed into the ammonium salt of the following formula:

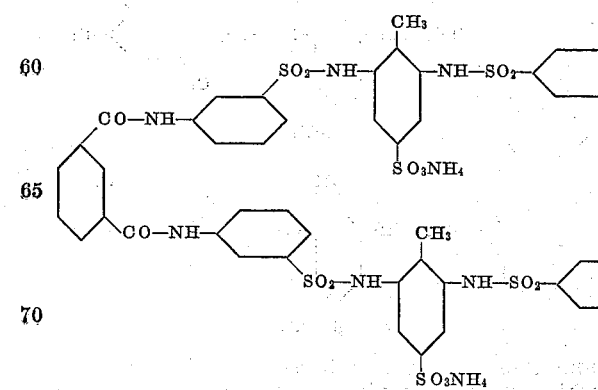

It yields a thinly liquid yellowish colored syrup in an about 25% aqueous solution. The product may be obtained as a colorless powder which easily redissolves in hot or cold water. The solution of the product weakly acidified with organic acid may be well employed as tanning extract.

In Examples 2–10 as starting materials for the decompositions described monoaminoarylacidyl-arylamide derivatives (acidyl=—SO₂— or —CO—) obtained from the 2-6 toluylenediamine-4-sulfonic acid have been chosen. For this reactions also other preparations analogously synthesized from other diaminosulfonic acids of the benzene series may be employed such as those of the 1,3-phenyldiamine-4-sulfonic acid and 5-sulfonic acid, those of the 2,4-toluylenediamine-5- and -6-sulfonic acid, of the 1,4-phenylenediamine-2-sulfonic acid and others, as well as mixtures of such preparations and, likewise, condensation products which may, for instance, be employed as tanning, reserving or precipitating agents for basic dyestuffs.

*Example 11.*—654 parts of bis-(3-aminobenzene-1-sulfonyl)benzidine-mm-disulfonic acid (German Patent 565,461, Example 6) are brought in solution with 6000 parts of water and about 100 parts of chalk at a temperature of about 70° C., 65 parts of chalk are introduced into the well-stirred solution while adding drop by drop from the separating funnel 270 parts of 3,4-dichlorobenzene-1-sulfochloride. The temperature is maintained for about 1 hour at 70–80° C. and finally for a short time at 90–100° C. The reaction mixture is acidified with hydrochloric acid and cooled. The mono-1,2-dichlorobenzene-4-sulfonyl-bis-(3'-aminobenzene-1'-sulfonyl)-benzidine-mm-disulfonic acid of the formula:

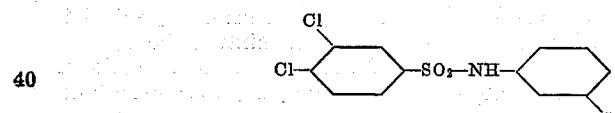
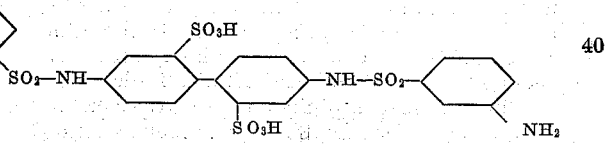

is obtained, which formula shows an about uniform structure. The product obtained separates as a solid, viscous paste at the bottom of the vessel and may be freed from the adhesive liquid by pressing or pouring off.

The product obtained is dissolved with about 4000 parts of water and the necessary quantity of caustic soda and the saturated neutral solution is treated at normal temperature with 60 parts of chalk and a paste consisting of 137.5 parts of benzene-1,3-disulfochloride, which paste has been obtained by grinding with cold water.

The reaction mixture which has been stirred turns to a thick mass after a short time so that it is necessary to increase the temperature to about 35–40° C., whereby the pasty mass dissolves again. If a test portion shows that no longer any nitrite is taken up it is acidified with hydrochloric acid. Hereby the condensation product of the formula:

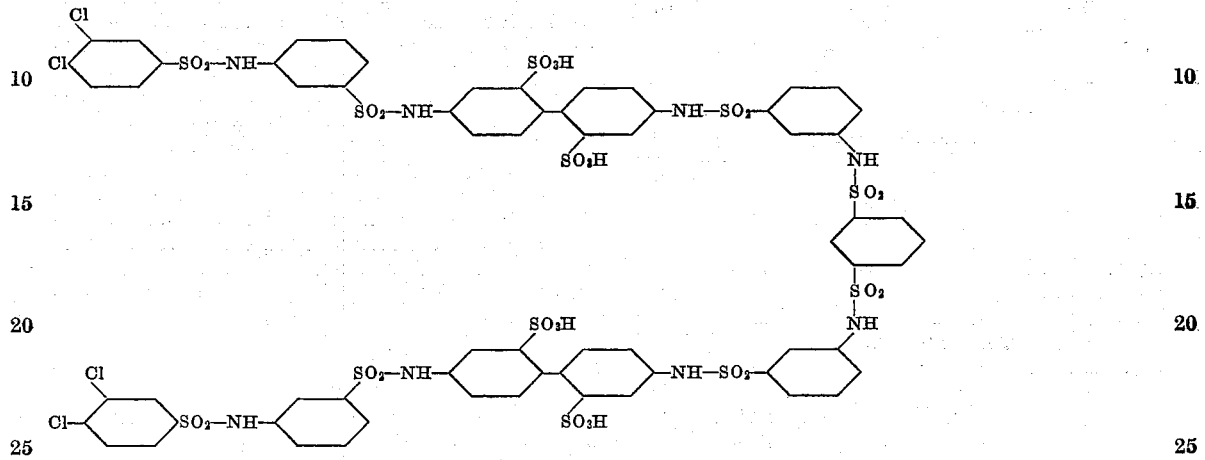

is obtained in a syrupy form which solidifies on cooling the mixture to a solid coherent mass. The liquid is poured off and the paste of the calcium sodium salt mixture which is well pressed off is transformed into the ammonium salt in the manner described above. This ammonium salt yields with the 3-fold quantity of water a weakly yellowish colored nearly liquid syrup which after having been acidified represents an excellent tanning extract.

The bis-(3-aminobenzene-1-sulfonyl)-mm-disulfonic acid may, for instance, be substituted by the bis-(3-aminobenzene-1-sulfonyl)-toluidine-mm-disulfonic acid or by the bis-(3-aminobenzene-1-sulfonyl)-diaminostilbendisulfonic acid or by other analogous diphenyl derivatives having other bridges between both aryl nuclei. Also a bis-(3-aminobenzene-1-sulfonyl)-phenylenediamine- or toluylenediaminesulfonic acid may, for instance, be used as starting material. However, in all cases preparations are obtained which are favorably distinguished by their reserving capacity for animal fibers as well as by their tanning properties.

*Example 12.*—202 parts of pure 2,6-toluylenediamine-4-sulfonic acid are dissolved while heating with the equivalent quantity of caustic soda solution in approximately 2000 parts of water. After cooling the thoroughly stirred reaction mixture to about 40° C. 60 parts of chalk and 145 parts of finely powdered benzene-1,3-disulfochloride are added, and stirring is continued until the evolution of carbon dioxide has ceased. The examination of a sample proves that the diazotation value of the 2,6-toluylene-diamine-4-sulfonic acid employed has been reduced to about 50%.

Now 350 parts of 2,4,5-trichlorobenzene-1-sulfochloride and about 90 parts of prepared chalk are introduced into the reaction mixture which is heated, while stirring, for about 2 hours to 40–50° C., then for another 2 hours to 50–60° C., and finally for a few hours to 60–70° C. until the formation of carbonic acid slows down again. The somewhat thickened reaction mass is cooled to normal temperature, sucked off, and again stirred into a paste with warm water, whereupon crude hydrochloric acid is added at a temperature of about 60° C. until the reaction is evidently rendered acid to Congo. Then a cold saturated calcium chloride solution is poured in until the sodium-calcium salt of the condensation product separates in a pasty form from the liquor. After cooling the reaction mass the aqueous solution, in which only small quantities of diazotizable substance are detectable, is separated from the solid mass by pouring off; the still adhering liquor is removed as far as possible by pressing off. The press cake is again emulsified with about 750 parts of warm water, whereupon about 200 parts of cold saturated calcium chloride solution are added to the emulsion until the precipitation of the condensation product is complete. After cooling the mixture the aqueous solution is poured off and the still enclosed liquor removed by pressing off the pasty to solid residue. By repeating this reprecipitation once more the mixture of calcium-sodium salts formed during the condensation is to a great extent converted into the uniform calcium salt. The paste thus obtained is stirred with 1500 parts of water whereto, while stirring, the quanity of ammonium oxalate required for precipitating the total quantity of calcium is added at a temperature of about 70° C. Hereupon the slightly yellowish solution is filtered with suction while hot from the precipitated calcium oxalate, the liquor being evaporated to syrup consistency or also to dryness. The ammonium salt of the condensation product thus obtained has the following formula:

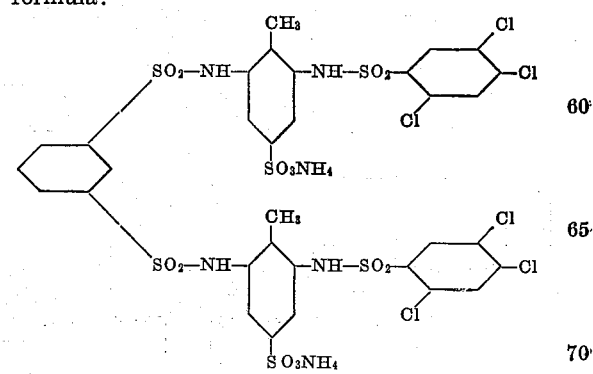

and represents when dried a colorless powder which dissolves easily in cold and warm water while sintering. The compound may be used as reserving agent for the animal fibre in the dyeing of mixed tissues with substantive dyestuffs, as mordant for the precipitation of basic dyestuffs in the preparation of varnish colors, and especially as a highly valuable tanning agent.

The example may be modified by replacing benzene-disulfochloride by substituted disulfochloride of the benzene, as for example the monochlorobenzene-disulfochloride or the 1,2-dichlorobenzene-4,6-disulfochloride or, for instance, by a toluene-disulfochloride. Instead of the 2,6-toluylene-diamine-4-sulfonic acid, for instance, also the 1,3-phenylene-diamine-4-sulfonic acid, the 1,3-phenylene-diamine-5-sulfonic acid, the 2,4-toluylene-diamine-5- and 6-sulfonic acid or other arylene-diamine-sulfonic acids of the benzene series may be used. The 2,4,5-trichlorobenzene-1-sulfochloride used in the end condensation may be replaced by benzene-sulfochloride or other halogen- or alkyl-substituted benzene-sulfochlorides or by a naphthalene-sulfochloride or also by a halogen- or alkyl-substituted or non-substituted benzene-carboxylic acid chloride. The products obtained have more or less reserving and tanning properties and are distinguished by excellent fastness to light on the materials treated therewith.

*Example 13.*—202 parts of pure 2,6-toluylenediamine-4-sulfonic acid are dissolved while heating by adding equivalent quantities of caustic soda solution in about 2000 parts of water. The mixture is cooled to about 40° C. and about 100 parts of chalk and 229 parts of a 1,2-dichlorobenzene-disulfochloride melting at 110–111° C., having the probable formula:

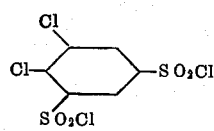

are added while stirring. The 1,2-dichlorobenzene-disulfochloride may be obtained by several hours boiling of o-dichlorobenzene with about the 10-fold quantity of chlorosulfonic acid, pouring the cooled sulfonation mixture on ice and redissolving the precipitated disulfochloride from benzene. It is advantageous to make the arylene-disulfochloride used first into a paste with a small quantity of cold water. The reaction mixture is well stirred at about 35–40° C. until the carbon dioxide evolution has ceased, whereby, by adding further quantities of chalk, care is taken that the reaction of the liquor always remains neutral. Towards the end of the reaction the mixture may be heated for some time to 60–70° C. A test portion of the mixture obtained shows by diazotization that after the reaction components have been introduced two thirds of the diazotization value of the 2,6-toluylenediamine-4-sulfonic acid which have been reacted are removed.

Into the well stirred mixture 45 parts of chalk and 187 parts of 1,2-dichlorobenzene-1-sulfochloride are introduced at 35–40° C. The mixture is kept at this temperature until no carbon dioxide evolution can be observed. The condensation product gradually separates as an oily mass. The temperature is raised within some hours to 70–80° C. The mixture is acidified with the necessary quantity of crude hydrochloric acid after no diazotisable substance is present in the reaction mixture. After cooling the condensation product is obtained as a solid viscous cake by pouring off the aqueous liquor. By emulgating with water several times at about 60° C. and reprecipitating with calcium chloride in the manner described in Example 1, the purified calcium salt which can be transformed into the corresponding alkali metal salt with ammonium- or sodium or potassium oxalate. In this manner viscous syrups are obtained or on drying of the solution colorless powders which are readily soluble in water and which may be used as reserving, highly efficacious tanning agents and mordants.

Also in this case the starting materials may be replaced as indicated in Example 1 for carrying out the process. Also instead of the pure components mixtures of homologues may be used in corresponding proportions. Thus, for instance, instead of the dichlorobenzenedisulfochloride a mixture of dichlorobenzenedisulfochloride with benzenedisulfochloride or monochlorobenzenedisulfochloride may be used, and the second stage of the process may be carried out, for instance, instead of with 1,2-dichlorobenzene-4-sulfochloride with a mixture of 3,4-dichlorobenzene-1-sulfochloride and 2,5-dichlorobenzene-1-sulfochloride or 2,3,4-trichlorobenzene-1-sulfochloride, or 2,4,5-trichlorobenzene-1-sulfochloride, whereby the properties of the substances as mordant for basic dyestuffs, reserving and tanning agents may be varied.

*Example 14.*—Into the condensation mixture prepared according to Example 1 by reaction of 2,6-toluylenediamine-4-sulfonic acid with benzene-1,3-disulfochloride in the proportion indicated 30 parts of chalk and 92 parts of 1,2-dichlorobenzene - 4,6 - disulfochloride which first have been ground to a fine dispersion are introduced at 40° C. while stirring. The mixture is stirred at 40–50° C. until the carbon dioxide evolution ceases and heated for several hours while gradually raising the temperature to about 70° C. It is then cooled to 40° C. and about 35 parts of chalk and 140 parts of 3,4-dichlorobenzene-1-sulfochloride are added. If after several hours the evolution of carbon dioxide ceases and a test portion shows that no diazotizable substance is present crude hydrochloric acid is added until the reaction is acid to Congo and the mixed calcium sodium salt obtained after cooling of the reaction mixture by pouring and pressing off of the liquor in a pasty form is transformed into the calcium salt. From the latter by reaction with sodium or ammonium oxalate the corresponding alkali metal salts are obtained from which viscous syrups are obtained which when weakly acidified yield excellent tanning extracts.

*Example 15.*—202 parts of pure 2,6-toluylenediamine-4-sulfonic acid are dissolved while hot in about 3000 parts of water while adding the equivalent quantity of caustic soda solution. 180 parts of naphthalene-1,5-disulfochloride which have been ground with a small quantity of water to a thin paste are introduced into the 50° C. warm solution together with about 80 parts of chalk. The mixture is well stirred for about 20 hours at 50–60° C. and heated to 90° C. during some hours. A test portion shows that only about 50% of the diazotization value of the 2,6-toluylenediamine-4-sulfonic acid present is detectable in the liquor. The mixture is cooled to 40–50° C., 282 parts of 3,4-dichlorobenzene-1-sulfochloride and about 70 parts of chalk are added to the still neutral solution and stirred at the temperature indicated until the evolution of carbon dioxide ceases. Towards the end the temperature is raised to 60–70° C., the mixture is acidified with the necessary quantity of crude hydrochloric acid after no diazotizable substance is present in a test portion, and cooled. From the paste obtained after cooling the sodium- or ammonium salt of the condensation product is obtained in the manner above specified over the calcium salt.

The product obtained as dry substance forms a colorless powder which readily dissolves in cold and warm water. The product may for instance be used as reserving agent for animal fibers, as a mordant for precipitating basic dyestuffs or as high grade tanning agent. The naphthalene-1,5-disulfochloride may be replaced by naphthalene-2,6-disulfochloride without the properties of the condensation product obtained changing essentially.

Example 16.—202 parts of pure 2,6-toluylenediamine-4-sulfonic acid are dissolved while hot with the necessary quantity of caustic soda solution in about 2000 parts of water. Into the well stirred solution 60 parts of chalk and 218 parts of diphenylsulfochloride melting at 175–176° C. are introduced at about 40° C., the diphenylsulfochloride having been ground to a finely dispersed paste. The temperature is first kept at 40–50° C. until the evolution of carbon dioxide slowly decreases, then the temperature is raised to about 90° C. within some hours. In that case only about half of the diazotization value of the 2,6-toluylenediamine-4-sulfonic acid introduced is detectable in the reaction liquid. The mixture is again cooled to 40–50° C., 282 parts of 3,4-dichlorobenzene-1-sulfochloride and about 70 parts of chalk are added at this temperature while stirring until the evolution of carbon dioxide slowly decreases and the mixture is finally heated for some hours to 60–70° C. After a test portion does not show any diazotizable substance, the mixture is acidified with hydrochloric acid and the precipitated calcium sodium salt is transformed into the difficultly water-soluble calcium salt which by several times emulgating with warm water is freed from neutral salts and transformed by reaction with alkali- or ammonium oxalate into the corresponding readily soluble alkali metal or ammonium salt.

These salts of the condensation product of the formula

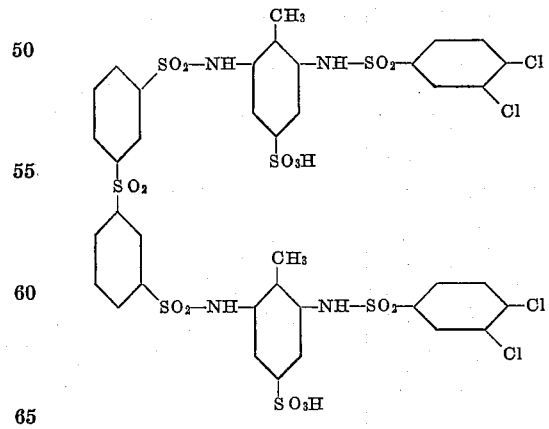

are colorless powders when dried which have excellent tanning properties. In this example the diphenylsulfo-3,3'-disulfochloride may also be replaced by chlorinated diphenylsulfondisulfochloride, such as for instance the 4,4'-dichlorobenzenesulfon-3,3'-disulfochloride melting at 236–237° C. and other substitution products of the diphenylsulfon, without the tanning substances obtained being considerably changed with regard to their properties.

Example 17.—286 parts of benzidine-o-monosulfonic acid sodium are dissolved in about 4000 parts of water while hot. Into the well stirred hot solution having a temperature of 60° C. 140 parts of finely powdered benzene-1,3-disulfochloride and 65 parts of chalk are introduced. The reaction mixture is kept at a temperature of about 60–70° C. until the evolution of carbon dioxide at neutral reaction of the liquor has completely ceased. It is cooled to 20° C. and the intermediate product of the formula

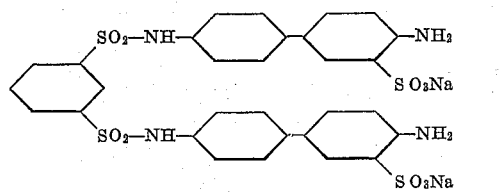

is obtained by filtering with suction in a yield of about 75% in a crystalline form. The product is then dissolved with the addition of a small quantity of caustic soda with 6000 parts of water while boiling hot and the filtered solution is stirred with 212 parts of 3,4-dichlorobenzenesulfochloride and about 60 parts of chalk at 60° C. After the evolution of carbon dioxide has ceased the mixture is cooled, the aqueous liquor is removed from the solid residue by pouring off. Once more 2000 parts of warm water are poured over the residue and crude hydrochloric acid is caused to run into the emulsion at about 60° C. until the aqueous solution reacts acid to Congo. After pouring off the liquid the calcium sodium salt of the condensation product is transformed into the corresponding sodium- or ammonium salt. A 25% sirup obtained from the ammonium salt which is completely freed from neutral salts hardly flows at ordinary temperature. The product has good tanning properties and can be used as reserving agent for animal fibers.

Example 18.—393.5 parts of the hydrochloric acid salt of 2,6-diaminotoluene-4-sulfonyl-aniline-3'-sulfonic acid (obtained by reaction of meta-sulfanilic acid sodium with the necessary quantity of 2,6-dinitrotoluene-4-sulfochloride in aqueous solution in the presence of chalk and subsequent reduction of the condensation product in aqueous solution with iron powder) are dissolved with about 4000 parts of water with the addition of the equivalent quantity of caustic soda solution. Into the 40° C. hot solution 145 parts of finely powdered benzene-1,3-disulfochloride and about 60 parts of chalk are introduced and the reaction mixture is stirred at the above indicated temperature until the evolution of carbon dioxide has ceased. Then half of the diazotization value of the liquid has disappeared. 350 parts of 2,4,5-trichlorobenzene-1-sulfochloride and about 90 parts of chalk are then added. The temperature is kept at 40–50° C. until the evolution of carbon dioxide has ceased. The temperature is then gradually raised until within some hours at neutral reaction also at 70° C. no carbon dioxide evolution can be observed. The mixture is cooled, the liquor is removed by pouring off, about 3000 parts of water of 60° C. are added and the emulsion is acidified by gradually adding the necessary quantity of crude hydrochloric acid until the reaction is distinctly acid to Congo.

The condensation product separates as a brittle product when cold. It can be filtered with suc- ammonium salt of the condensation product of the formula:

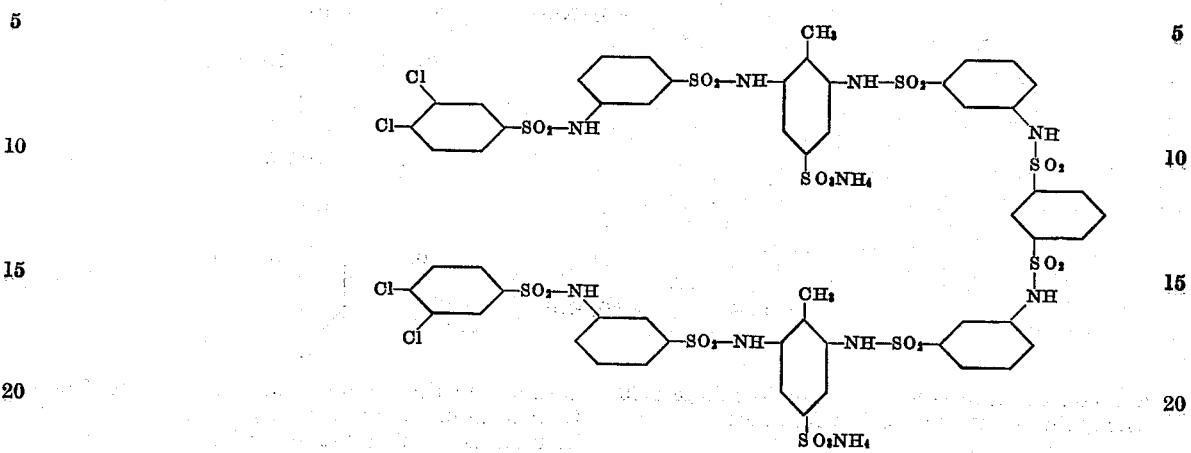

tion and worked up in the manner described in the former examples to the corresponding ammonium- or sodium salt. The alkali metal salts of the condensation product of the formula:

are readily soluble in cold and warm water and have good tanning and reserving properties.

*Example 19.*—512 parts of bis-(3'-aminobenzenesulfonyl) -2,6- toluylenediamine - 4 - sulfonic acid (obtained by condensation of 2 mols of 3-nitrobenzene-1-sulfochloride with 1 mol of 2,6-toluylenediamine-4-sulfonic acid in aqueous solution in the presence of chalk and reduction of the condensation product in aqueous solution with iron powder are neutrally dissolved with 4000 parts of water while hot and with the addition of the necessary quantity of caustic soda solution. About 70 parts of chalk and 145 parts of finely powdered benzene-1,3-disulfochloride are added and the emulsion is stirred at about 40° C. until the evolution of carbon dioxide has decreased. Towards the end the mixture is heated for some hours to 60° C. By diazotization of an equivalent test it can be established that about 50% of the diazotizable amino groups in the diamino compounds have reacted. For completing the condensation 282 parts of 3,4-dichlorobenzene-1-sulfochloride and about 70 parts of chalk are introduced. The mixture is stirred at 60° C. until the evolution of carbon dioxide ceases. The reaction product soon is obtained as an oily mass and after cooling to about 20° C. may be filtered with suction as solid brittle mass from the clear solution. Purification and reprecipitation of the calcium sodium salt to the readily water-soluble proceeds in the usual manner. The product when dissolved in water to about 25% forms a viscous syrup which can be advantageously used as tanning extract for preparing full soft white leathers which are fast to light.

*Example 20.*—202 parts of pure 2,6-toluylenediamine-4-sulfonic acid are dissolved with the equivalent quantity of caustic soda solution in 2000 parts of warm water. 145 parts of finely powdered benzene-1,3-disulfochloride and about 60 parts of chalk are introduced into the solution. The mixture is stirred at 40° C. until the evolution of carbon dioxide has ceased. 254 parts of finely sieved 3-nitrobenzene-sulfochloride and about 70 parts of chalk are added to the neutral solution which only has half its diazotization value. The mixture is further stirred at about 40° C. until the evolution of carbon dioxide has decreased. It is then heated for a short time to 55–60° C. and acidified with excess crude hydrochloric acid if no diazotizable substance is present in the reaction mixture. After cooling the clear liquor may be drawn off from the syrup at the bottom of the vessel. The syrup is dissolved with about 2000 parts of water while hot and the solution thus obtained gradually introduced into a well stirred 90° C. hot suspension of 400 parts of iron powder in 1000 parts of water which has been acidified with hydrochloric acid. The mixture is stirred for several hours at 90° C., rendered alkaline after the reduction is complete with caustic soda solution, the reduction liquor is filtered with suction from the iron sludge and poured on to excess crude hydrochloric acid. The amino compound of the formula:

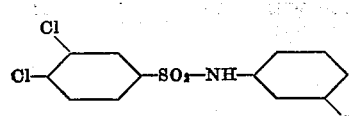
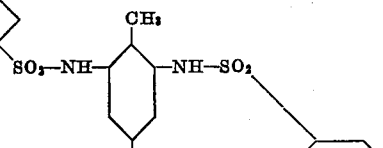
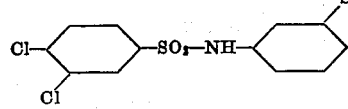

The products of the formula:

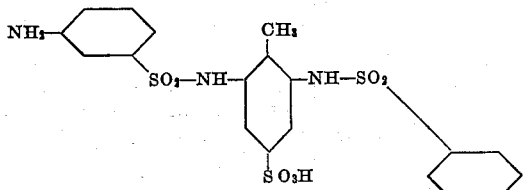

is obtained in a good yield as a light colored coarse product.

458 parts of the said diamino compound are dissolved while adding the equivalent quantity of caustic soda solution in about 3000 parts of warm water. The mixture is cooled to 40° C., 282 parts of 3,4-dichlorobenzene-1-sulfochloride and about 70 parts of prepared chalk are added and the mixture is stirred until the evolution of carbon dioxide ceases. It may then be heated for a short time to 60-70° C. and, if no diazotizable substance is present, acidified with crude hydrochloric acid until the reaction solution remains acid to Congo. Finally it is cooled to about 20° C., the clear liquor is removed from the cake of the condensation product sticking firmly together by pouring off. The condensation product is transformed by reprecipitation of the sodium calcium salt mixture in the manner described above into the water-soluble ammonium- or alkali-metal salt.

obtained in this manner form when dried from their solutions light colored powders which may be used as tanning agents or for reserving animal fibers, or as mordants for precipitating basic dyestuffs.

I claim:

Substituted arylacidylamino compounds selected from the class of those having the following formulae:

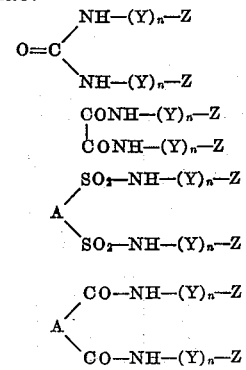

and

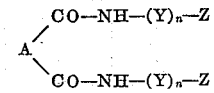

in which A stands for aryl, Y stands for a member of the group consisting of —RSO₂NH—, —RNHSO₂—, —RCONH— and —RNHCO—, R being an aryl radical, Z stands for an aryl radical and $n$ is an integer being at least equal to 1, the molecule of the said compounds containing at least 5 aromatic nuclei, at least 4 sulfonimido groups and at least 2 free sulfonic acid groups, the said compounds, in the form of their alkali and ammonium salts, being colorless or nearly colorless powders which are soluble in water and are valuable tanning agents and reserving agents for animal fibres against substantive dyestuffs.

JOHANN HUISMANN.